Figure 1:
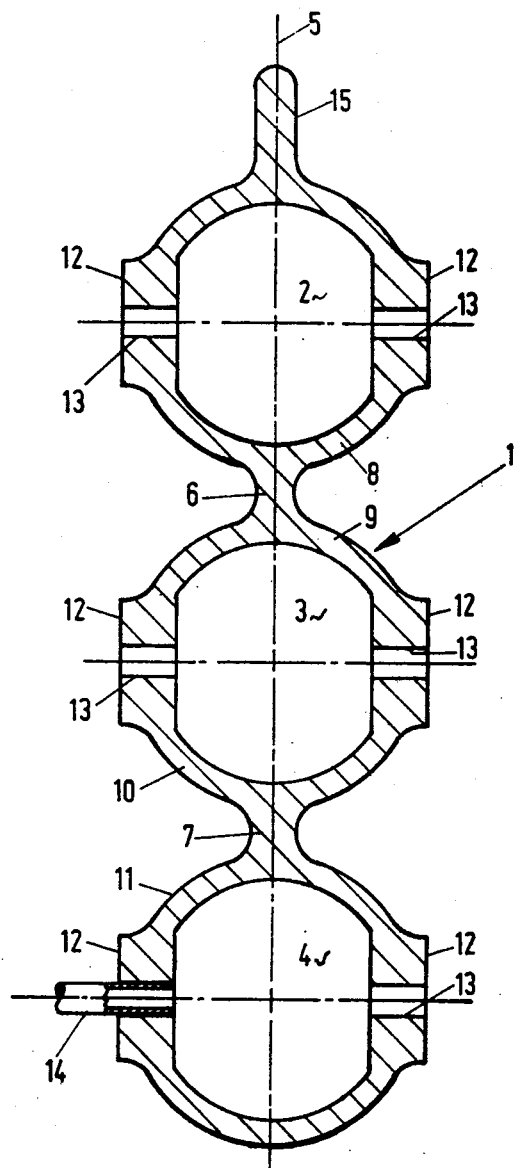

United States Patent [19]

Abrahamsen et al.

[11] 3,954,122

[45] May 4, 1976

[54] COLD PRESSURE WELD, AND LOW-PRESSURE PIPING SYSTEM CAPABLE OF BEING MADE WITH THIS COLD PRESSURE WELD

[75] Inventors: Theodorus Gerrit Abrahamsen, Koudekerk ander Rijn; Tom deBlieck, Krimpen ander IJssel, both of Netherlands

[73] Assignee: Ultra Centrifuge Nederland N.V., The Hague, Netherlands

[22] Filed: Oct. 5, 1973

[21] Appl. No.: 403,855

[30] Foreign Application Priority Data

Oct. 11, 1972   Netherlands.................... 7213724

[52] U.S. Cl. ................... 137/561 A; 285/137 R; 285/286; 285/330
[51] Int. Cl.² ........................................ F16L 19/00
[58] Field of Search ............... 137/561 A, 580; 138/111, 115, 155, 156, 157, 158, 159; 29/470.1, 470.3; 285/137 R, 286, 330, 333

[56] References Cited
UNITED STATES PATENTS

| | | | |
|---|---|---|---|
| 1,260,690 | 5/1918 | Liady | 285/330 |
| 1,459,476 | 6/1923 | Meredith | 138/117 |
| 2,631,871 | 3/1953 | Stone | 285/333 |
| 2,719,210 | 9/1955 | Chapman | 285/286 |
| 2,911,200 | 11/1959 | Gardner et al. | 285/286 |
| 2,914,346 | 11/1959 | Ryder | 285/286 |
| 3,551,995 | 1/1971 | Marechal | 285/286 |
| 3,805,847 | 4/1974 | Manning | 138/115 |

Primary Examiner—Martin P. Schwadron
Assistant Examiner—G. L. Walton
Attorney, Agent, or Firm—Cushman, Darby & Cushman

[57] ABSTRACT

Headers for low pressure piping system, preferably of the type that has multiple channels and is split in two parts, that can be jointed by means of grooves the side walls of which interlock at such a small angle to a perpendicular on the central plane that, upon pressing the parts of the weld together, the walls thereof become welded together as a result of friction, pressure and plastic deformation.

4 Claims, 7 Drawing Figures

COLD PRESSURE WELD, AND LOW-PRESSURE PIPING SYSTEM CAPABLE OF BEING MADE WITH THIS COLD PRESSURE WELD

The invention relates to a low-pressure or vacuum piping system comprising a number of headers, one header of which is connected to a number of distributing pipes. In the known piping systems of this type, the connections between the headers and the distributing pipes are produced by means of a number of electric welds or by means of soldered joints. This method of providing junctions, however, entails a drawback in cases where a very large number of such headers and/or distributing pipes are involved.

It should be noted that "distributing pipes" in the following are understood to indicate both the pipes through which a medium flows to the headers and those from which it flows out of them.

Another drawback resides in the large number of fastening or suspension members required for reliably anchoring the many headers in a system.

First of all, this last drawback is met according to the invention by accommodating at least two such headers in a multiple header. In this respect, it is specifically serviceable to have the headers in a multiple header extend parallel to each other, in such a way that the central axes of these headers are located in one common central plane of the multiple header.

The headers of a multiple header are preferably connected to each other by at least one jointing wall portion which is so located between the headers as to constitute part of both of them. The measures discussed hereinabove then provide at once a saving on the number of fastening members required. Now, by taking the additional measure of providing each header at least on one side of the central plane with an outside flat wall portion serving for the connecting openings which receive the distributing pipes, the operation of fitting these distributing pipes is greatly facilitated.

It is furthermore serviceable to provide at least one of the outside headers with a rib for fastening or suspension purposes. As a result, both the fastening of the headers described and their suspension are greatly simplified. Such a header can extend over relatively large distances, generally in a virtually horizontal direction, without any need for applying intermediate supports or bridging pipes. The reason is that this header itself serves as a rigid sectional girder with a relatively high moment of resistance to bending in the central plane. This effect can be enhanced by mounting several header sections laterally to each other or by combining these header sections to form one tube. Such composite members also possess a high resistance to lateral bending moments. Such lateral bending moments may originate from such sources as wind or from other structural members that are attached to the headers.

The distributing pipes can be connected directly to the headers if the flat wall portion thereof has a greater wall thickness than the remaining wall of the header, and if the distributing pipes are furthermore jointed to the multiple header with the aid of an explosive weld. The explosive welding technique may also be used for joining several headers together. In such case, it is possible, for example, to arrange short pieces of pipe between two neighboring header compartments at regular distances from each other, and to weld the ends thereof explosively to the header. Such short pieces of pipe, which serve exclusively as mechanical connecting members, are alternated with pipe connections of the distributing pipes.

Installation of the aforementioned low-pressure piping system becomes particularly simple by dividing each multiple header along the central plane into two separate components which are sealed hermetically to each other on the common joints. Such composite headers consisting of two halves are easier to manufacture, so that savings in manufacturing cost can be attained. This is specifically so when the sealing joints are made with a pressure weld that can be applied in the cold state and which is brought about by pressing the header halves to each other. Use is here made of sealing joints provided with grooves the side walls of which interlock at such a small angle to a perpendicular on the central plane that, upon pressing the parts of the weld together, the walls thereof become welded together as a result of friction, pressure and plastic deformation. In order for this measure to be capable of being implemented, use must be made of such a material for the separate parts of such a multiple header that at least the surfaces of a sealing joint which come into contact with each other are marked by the presence of a material which is conducive to cold welding. Such a material is, for example, aluminum or an alloy thereof.

To attain greater security for the sealing toward the outside, the separate components of a multiple header can be provided on the periphery of the central plane with a separate sealing weld, which can be produced in the form of a prior-art electric weld.

Attention is called to the fact that the cold pressure-weld joint can be applied not only to high-vacuum sealing joints, but that this method of compression welding is furthermore serviceable for other technical applications in producing joints in a simple manner. Thus, the invention comprises the general scope of providing a cold pressure-weld construction for permanently joining structural components along a preferably flat partial joint, the material of these structural components, at least in the surface of the partial joint which are brought into contact with each other under pressure, being constituted by a material which is conducive to cold welding, such as, for example, aluminum or alloys thereof, the structural components in the partial joint furthermore being provided with grooves the side walls of which interlock at so small an angle to a perpendicular on the plane of the partial joint that this process of cold welding is stimulated.

Some embodiments of the invention are described in further detail, by way of examples, on the basis of the following figures.

In these figures:

FIG. 1: represents a cross section through a multiple header according to the invention.

Figure 2:
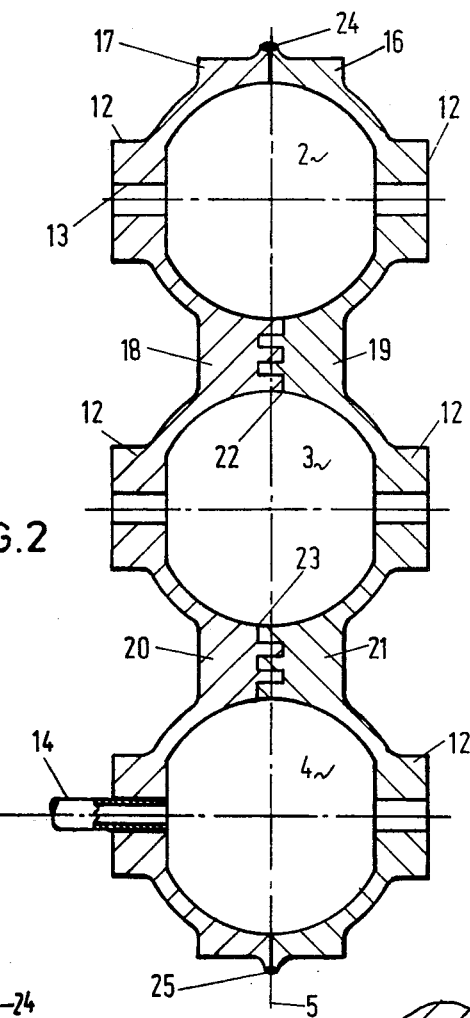

FIG. 2: represents a multiple header according to the divided design.

Figure 3:
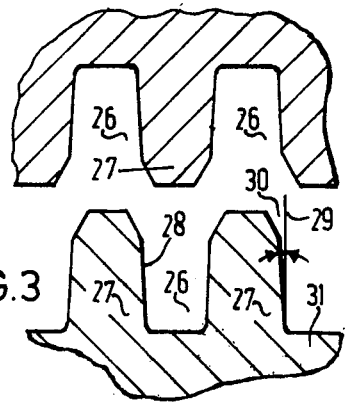

FIG. 3: indicates details of the grooves provided in the pressure-weld joints according to FIG. 2, likewise represented in cross section.

Figure 4:
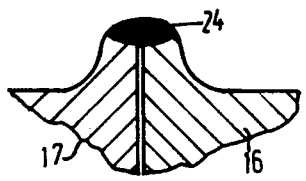

FIG. 4: represents a detail of a sealing weld as provided in FIG. 2.

Figure 5:
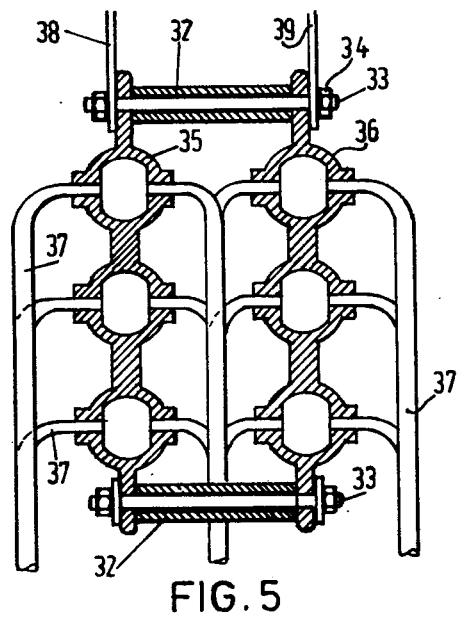

FIG. 5: represents two combined multiple headers, shown in cross section, equipped with a number of distributing pipes.

Figure 6:
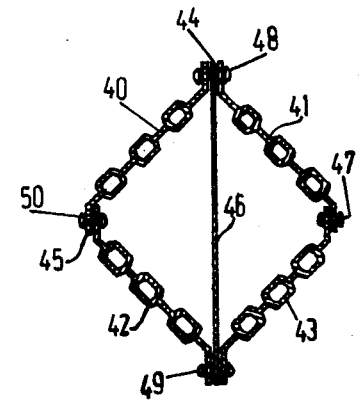

FIG. 6: represents four multiple headers so combined as to form a column structure, shown as a cross section through this column.

Figure 7:
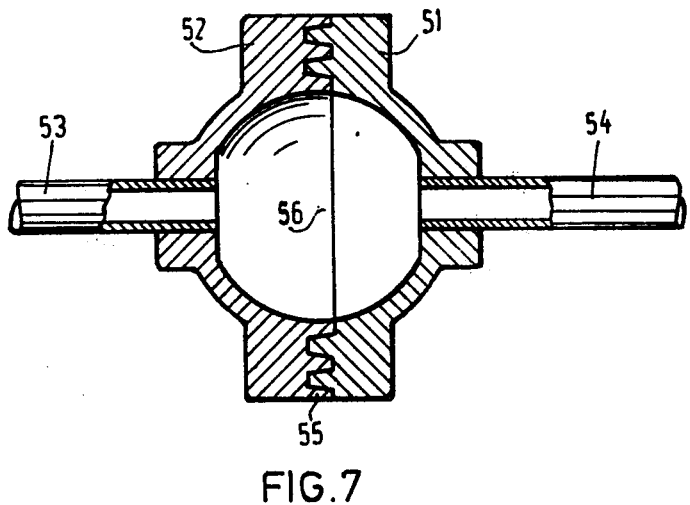

FIG. 7: represents a flanged joint for vacuum pipes provided with the aid of the invention according to the patent application.

FIG. 1 shows in cross section a multiple header 1 which comprises the headers 2, 3 and 4. The numeral 5 indicates the common central plane as mentioned hereinbefore. Two connecting wall portions 6 and 7 connect the wall portions 8 and 9, and 10 and 11, respectively, to each other. The wall portions 12 are locally thicker than the other walls of the headers so as to be more easily capable of accommodating the connections of the distributing pipes. Passages or bores 13 are provided for this purpose. A distributing pipe 14 is already mounted in one of these openings. A rib 15 is provided on the upper side of the multiple header to serve for purposes of connecting as well as of suspension.

FIG. 2 shows a cross section through a multiple header composed of two separate parts 16 and 17 which fit together along the central plane 5. For this purpose, the connecting wall portions 18, 19, 20 and 21 are slightly thicker than the corresponding portions in FIG. 1, and are furthermore provided with pressure-weld grooves 22 and 23, respectively. These last junctions are brought about by placing the parts 16 and 17 upon each other in such a way that the grooves and the serration fit into each other, whereupon the pressure-weld joints are produced by compression. For attaining greater security with regard to sealing from and toward the outside, a sealing weld may be provided at the points 24 and 25, as shown more clearly in the detail drawing of FIG. 4.

FIG. 3 shows a cross section of a detail of the sealing grooves. These sealing grooves are composed of a number of recesses 26 and projections 27 which are so dimensioned as to be capable of fully penetrating into each other when some pressure is applied. The flanks 28 of these grooves exhibit an extremely small angle 30 to a perpendicular 29 erected on the face 31. This accordingly is at the same time a perpendicular on the plane of the partial joint. In the case of aluminum it has been found that the best value for this angle amounts to 1° of arc ± 30 minutes of arc (1° ± 30′).

FIG. 5 shows how multiple headers of the type of FIG. 1 can be combined to form a kind of composite structure. Using bolts 33 and pipes 32, which serve as spacers, two multiple headers 35 and 36 are fastened to each other with the aid of nuts 34; the number 37 indicates a number of distributing pipes which extend from the multiple headers to apparatus or machines installed underneath these headers but not shown. The multiple headers are suspended with the aid of strips 38 and 39 which are suspended outside the upper limits of the drawing on parts of the roof structure of a plant which are not shown.

FIG. 6 shows a cross section of a tubular composite construction. Use is here made of four multiple headers 40, 41, 42 and 43 which possess the special feature that the ribs 44 and 45 at the ends of a header are bent over by 45 degrees toward opposite sides. With the use of a stiffening web plate 46 as well as of bolted, riveted or screwed joints 47, 48, 49 and 50, it is now possible in a simple manner to combine the multiple headers to a column structure which can be used, for example, for conveying certain media from one floor level of the plant to another floor level, in such a way that these transport columns even contribute to the rigidity of the building.

FIG. 7 illustrates a flange joint for a vacuum or low-pressure piping system, where the flanges 51 and 52 are provided with the grooves according to the design of FIG. 3. The flanges are fitted on the pipes 53 and 54. Unlike the grooves of FIG 2, where the grooves extend in the direction of the headers 2, 3 and 4, the grooves 55 in FIG. 7 extend in circular rows around the center 56 of the flanged joint.

We claim:
1. A high vacuum piping system comprising
   a plurality of headers, at least one header of which is connected to a number of distributing pipes,
   a multiple header comprised of at least two of said plurality of headers, the central axes of said headers of said multiple header being located in one common central plane,
   means for connecting said headers of said multiple header together, said means comprising at least one jointing wall portion which is located between the headers it connects together and constitutes a part of each of them,
   said multiple header being divided along the central plane into two separate components, said components having cooperating junction surfaces, and
   means for hermetically sealing said separate components along said junction surfaces, said means comprising a cold state compression pressure weld at at least one junction surface.

2. A system as recited in claim 1 wherein at least one of said headers is provided with a rib for fastening thereof to accessory apparatus.

3. A system as recited in claim 1 wherein the portions of said multiple header components adjacent said junction surfaces thereof are composed of a material that is conducive to cold welding, and further comprising means for facilitating cold welding of said junction surfaces, said means comprising a plurality of recesses and projections along at least one of said junction surfaces capable of fully penetrating into each other when pressure is applied and which interlock at a small angle to a perpendicular on the central plane.

4. A system as recited in claim 3 wherein said material composing said multiple header portions is selected from the group consisting of aluminum and aluminum alloys, and wherein said small angle is 1° of arc ± 30 minutes of arc.

* * * * *